US012780314B2

(12) United States Patent
Groth et al.

(10) Patent No.: US 12,780,314 B2
(45) Date of Patent: Nov. 3, 2026

(54) PATH FOLLOWING ALGORITHM FOR REVERSING A HEAVY-DUTY VEHICLE

(71) Applicant: Volvo Autonomous Solutions AB, Gothenburg (SE)

(72) Inventors: Björn Groth, Gothenburg (SE); Josef Kindberg, Torslanda (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 19 days.

(21) Appl. No.: 18/876,057

(22) PCT Filed: Jun. 29, 2022

(86) PCT No.: PCT/EP2022/067972
§ 371 (c)(1),
(2) Date: Dec. 17, 2024

(87) PCT Pub. No.: WO2024/002483
PCT Pub. Date: Jan. 4, 2024

(65) Prior Publication Data
US 2025/0382008 A1 Dec. 18, 2025

(51) Int. Cl.
*B62D 15/02* (2006.01)
*G08G 1/16* (2006.01)

(52) U.S. Cl.
CPC ......... *B62D 15/0285* (2013.01); *G08G 1/168* (2013.01)

(58) Field of Classification Search
CPC ............................ B62D 15/0285; G08G 1/168
See application file for complete search history.

(56) References Cited

U.S. PATENT DOCUMENTS

2017/0197615 A1 7/2017 Elie et al.
2018/0057052 A1* 3/2018 Dodd .................. B62D 15/023
(Continued)

FOREIGN PATENT DOCUMENTS

CN 106327433 B 3/2019
CN 111332279 A 6/2020
(Continued)

OTHER PUBLICATIONS

International Preliminary Report on Patentability and Written Opinion dated Jan. 9, 2025 in corresponding International PCT Application No. PCT/EP2022/067972, 8 pages.
(Continued)

*Primary Examiner* — Rami Khatib
(74) *Attorney, Agent, or Firm* — Jeffri A. Kaminski; Venable LLP

(57) ABSTRACT

A computer implemented method controls a non-articulated heavy-duty vehicle during a reversal maneuver. The method includes obtaining a pose path indicative of a path to be followed by the vehicle and an orientation to be adhered to by the vehicle during the reversal maneuver, determining a virtual front wheel geometry of the vehicle by mirroring a steered front wheel of the vehicle about a non-steered rear wheel location on the vehicle, along a longitudinal extension direction of a wheelbase of the vehicle, where the mirrored steered front wheel corresponds to a virtual front wheel in the virtual front wheel geometry, establishing a control relationship between the virtual front wheel and the steered front wheel, such that a steered angle at the virtual front wheel corresponds to an equivalent steered angle at the steered front wheel, determining a virtual front wheel target path based on the virtual front wheel geometry of the vehicle and on the pose path, and controlling the heavy-duty vehicle
(Continued)

by controlling the virtual front wheel to follow the virtual front wheel target path.

16 Claims, 4 Drawing Sheets

(56) References Cited

U.S. PATENT DOCUMENTS

| | | | |
|---|---|---|---|
| 2019/0086204 A1 | 3/2019 | Critchley et al. | |
| 2020/0148257 A1 | 5/2020 | Niewiadomski et al. | |
| 2020/0180691 A1 * | 6/2020 | Sandblom | B60W 30/18036 |
| 2022/0177033 A1 | 6/2022 | Laine et al. | |
| 2024/0239409 A1 * | 7/2024 | Tokoro | B62D 6/002 |
| 2025/0178668 A1 * | 6/2025 | Nitta | B62D 13/06 |
| 2025/0187661 A1 * | 6/2025 | Nitta | B62D 15/0285 |

FOREIGN PATENT DOCUMENTS

| | | | | |
|---|---|---|---|---|
| CN | 111547066 A | | 8/2020 | |
| CN | 112238864 A | | 1/2021 | |
| DE | 102023113599 A1 | * | 11/2024 | B62D 15/0285 |
| IN | 201641020998 | | 3/2019 | |

OTHER PUBLICATIONS

International Search Report and Written Opinion of the International Searching Authority in corresponding International Application No. PCT/EP2022/067972 mailed Feb. 16, 2023 (13 pages).

* cited by examiner

PATH FOLLOWING ALGORITHM FOR REVERSING A HEAVY-DUTY VEHICLE

CROSS-REFERENCE TO RELATED APPLICATIONS

This application is a U.S. National Stage application of PCT/EP2022/067972, filed Jun. 29, 2022 and published on Jan. 4, 2024, as WO 2024/002483, all of which is hereby incorporated by reference in its entirety.

TECHNICAL FIELD

The present disclosure relates to control of heavy-duty vehicles, and in particular to methods and control units for reversing non-articulated heavy-duty vehicles, such as rigid trucks, and dumpers.

BACKGROUND

Advanced driver assistance systems (ADAS) and methods for autonomous drive (AD) normally base vehicle control on some form of path following algorithm. The control system first determines a desired path to be followed by the vehicle, e.g., based on a current transport mission, together with environment data indicating possible routes to take in order to navigate the vehicle from a vehicle pose at one location to another pose at another location.

Path following is the process concerned with how to determine vehicle speed and steering at each instant of time for the vehicle to adhere to a certain target path to be followed. There are many different types of path following algorithms available in the literature, each associated with its respective advantages and disadvantages, and each having an associated level of complexity.

A path following algorithm normally uses the front wheel, the rear wheel, or the centre of gravity of the vehicle as reference point and tries to manoeuvre the vehicle such that the reference point follows an intended target path. If the rear axle is used as reference point, then the front axle movement can in some cases become large, which is undesired.

Therefore, many path following algorithms use the vehicle front axle as reference point because the kinematics of the vehicle will then make the rear axle of the vehicle follow a desired rear wheel path without large magnitude deviation.

The rear wheel path is often important when reversing a vehicle (since it is the leading part of the vehicle during the reversal maneuver). However, if the path following algorithm only uses the rear wheel position as reference, then undesired large front wheel movements may result. Thus, complex algorithms dedicated to reversing heavy-duty vehicles are often used which comprise advanced computations for reducing the motion of the front axle during reversal.

There is a need for less complex robust path following algorithms for reversing heavy-duty vehicles.

SUMMARY

It is an object of the present disclosure to provide computer implemented methods, computer programs, and control units for reversing a non-articulated heavy-duty vehicle.

This object is at least in part obtained by a computer implemented method for controlling a non-articulated heavy-duty vehicle during a reversal maneuver. The method comprises obtaining a pose path indicative of a path to be followed by the vehicle and an orientation to be adhered to by the vehicle during the reversal maneuver. The method also comprises determining a virtual front wheel geometry of the vehicle by mirroring a steered front wheel of the vehicle about a non-steered rear wheel location on the vehicle, along a longitudinal extension direction of a wheelbase of the vehicle, where the mirrored steered front wheel corresponds to a virtual front wheel in the virtual front wheel geometry. By establishing a control relationship between the virtual front wheel and the steered front wheel, such that a steered angle at the virtual front wheel corresponds to an equivalent steered angle at the steered front wheel, and determining a virtual front wheel target path based on the virtual front wheel geometry of the vehicle and on the pose path, it becomes possible to control the heavy-duty vehicle during the reversal maneuver by controlling the virtual front wheel to follow the virtual front wheel target path just like as if the virtual front wheel had been a steered front wheel during a forward driving path following maneuver. This makes is possible to use a path following algorithm that is designed for forward driving also when reversing by redefining steered angle and the position of the front wheel of the vehicle. It is an advantage that the complex dedicated reversal algorithms mentioned above are avoided, and that the same algorithm can be used for both forward driving path following and path following during reversal maneuvers. In fact, no significant changes to existing forward driving path following implementations are required, since they can be fed with the virtual front wheel target path when reversing, and the output desired steering angles from the existing algorithms can simply be converted into the equivalent steering controls to be applied at the steered front wheel using the virtual front wheel geometry of the vehicle. The virtual front wheel geometry of the vehicle can advantageously be defined using a bicycle model of the vehicle which is a model associated with a low degree of complexity and permits processing at a reasonable computational burden. However, other vehicle models may of course also be used.

The disclosed methods can be applied in e.g., ADAS functions, semi-autonomous drive applications and/or in autonomous drive applications.

The rear wheel of the virtual front wheel geometry of the vehicle can be a lumped axle non-steered rear wheel in a bicycle model of the vehicle in case the vehicle comprises more than one rear wheel axle. Thus, the methods are applicable to vehicles comprising any number of rear axles.

According to some aspects, the control relationship between the virtual front wheel and the steered front wheel is a mirrored steering angle relationship. This means that a desired steered angle at the virtual front wheel can be directly translated into an equivalent steered front wheel angle by a simple change in sign. This conversion can be performed without significant computational burden, which is an advantage.

According to other, more advanced, aspects of the technique, the control relationship between the virtual front wheel and the steered front wheel is determined by a coordination of a plurality of MSD of the vehicle. This way actuator control strategies involving, e.g., steer by braking and differential application of propulsion torque can be used also during reversal, which is an advantage.

The method optionally also comprises validating the pose path based on the determined virtual front wheel geometry of the vehicle and triggering an event in case the validation fails. The method may for instance comprise predicting a swept area of the vehicle during the maneuver and comparing the swept area to an allowable driving area associated with the reversal maneuver, and/or predicting a maximum steering angle of the vehicle during the maneuver and comparing the maximum steering angle to an allowable range of steering angles associated with the vehicle.

There are also disclosed control units and vehicles associated with the above-mentioned advantages.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
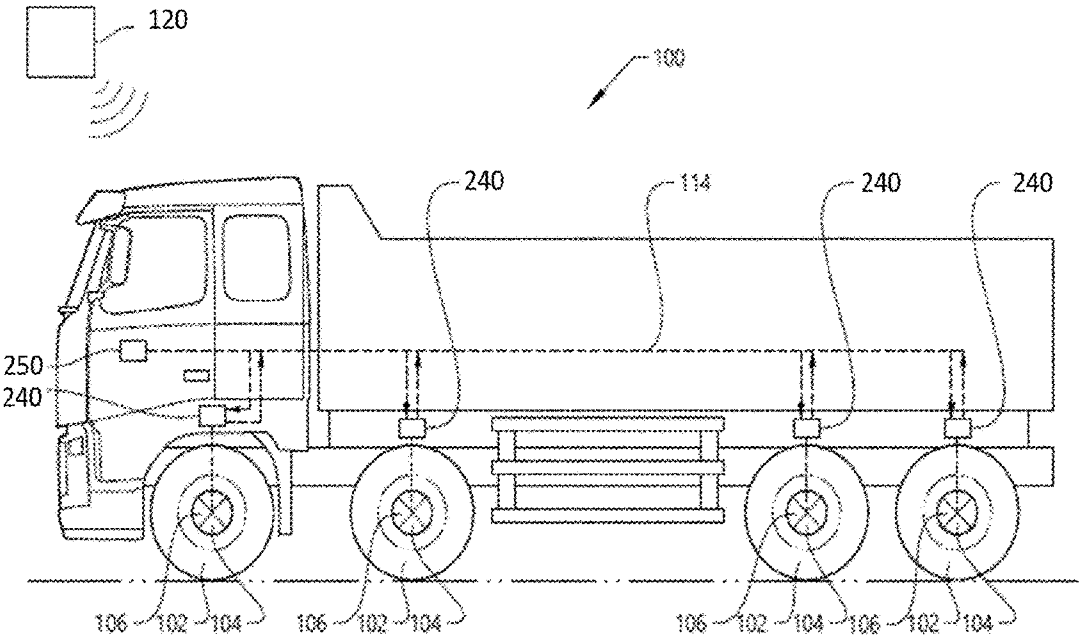
FIG. 1 schematically illustrates an example non-articulated heavy-duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example heavy-duty vehicle 100, here in the form of a rigid truck. It is however appreciated that the herein disclosed methods and control units can be applied with advantage also in other types of non-articulated vehicles, such as in various construction equipment vehicles and also in passenger cars.

The example vehicle 100 comprises a plurality of wheels 102, wherein at least a subset of the wheels 102 is associated with a propulsion device 104 and/or a service brake 106. The vehicle 100 also comprises one or more power steering devices (not shown in FIG. 1) to control a wheel angle of a steered front wheel and/or other steered wheels on the vehicle 100. The propulsion devices, service brakes, and power steering devices are herein collectively referred to as motion support devices (MSD). Each MSD is connected to an MSD control unit 240 arranged for controlling various operations of the MSD. The MSD control system, i.e., the system of MSD control units, may be a decentralized system running on a plurality of separate wheel-end computers, although centralized implementations are also possible. It is furthermore appreciated that some parts of the MSD control system may be implemented on processing circuitry remote from the vehicle, such as on a remote server 120 accessible from the vehicle via wireless link. Each MSD control unit 240 is connected to a vehicle motion management (VMM) system or function 250 of the vehicle 100 via a data bus communication arrangement 114 that can be either wired, wireless or both wired and wireless. Hereby, control signals can be transmitted between the VMM function 250 and the MSD control units 240.

The VMM function 250 as well as the MSD control units 240 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device. Implementation aspects of the different vehicle unit processing circuits will be discussed in more detail below in connection to FIG. 9.

Figure 2:
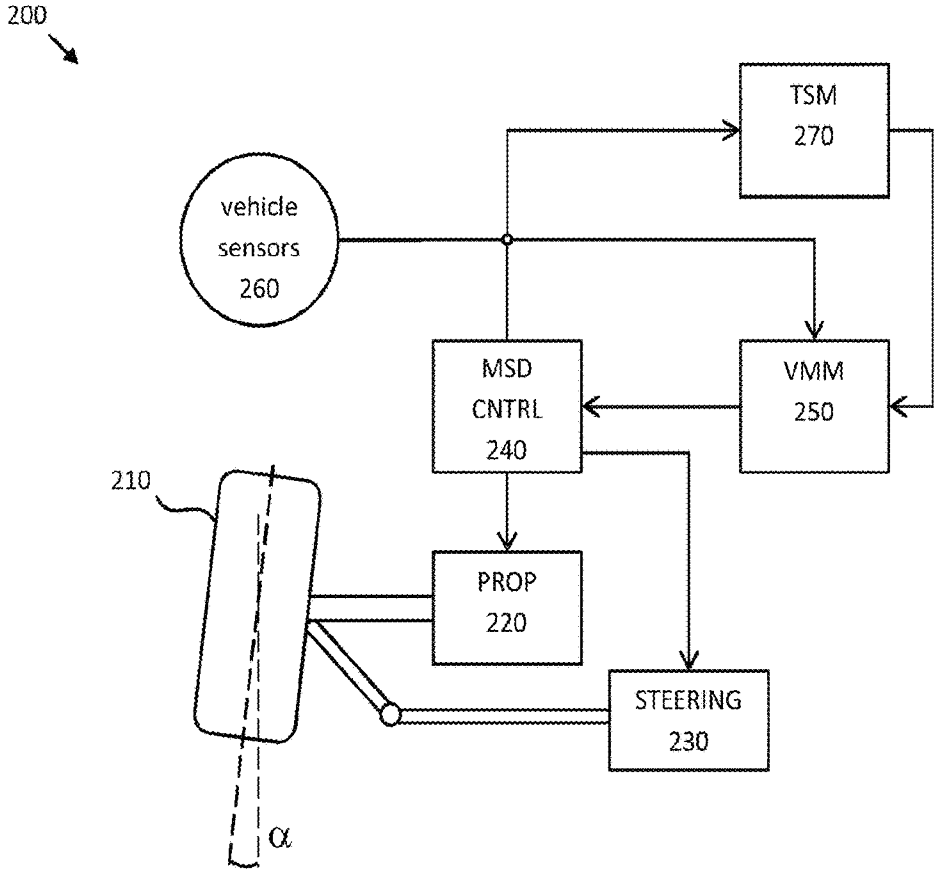
FIG. 2 shows an example vehicle motion control system.

FIG. 2 schematically illustrates functionality 200 for controlling a steered wheel 210 of the vehicle 100, by some example MSDs here comprising a power steering arrangement 230 and a propulsion device 220 such as an electric machine (EM) or combustion engine. The power steering arrangement 230 and the propulsion device 220 are examples of actuators which can be controlled by one or more MSD control units 240. It is appreciated that the torque generating actuators of the vehicle can be used also for steering. Thus, vehicle steering can be achieved either by actuating the power steering arrangement 230 and/or by application of different amounts of torque on the left and right sides of the vehicle.

A traffic situation management (TSM) function 270 plans driving operations with a time horizon of, e.g., 1-10 seconds or so. This time frame corresponds to, e.g., the time it takes for the vehicle 100 to negotiate a curve. A path following algorithm can be implemented in the TSM function 270 and used to control MSDs to make the vehicle follow a target path. The vehicle manoeuvres, planned and executed by the TSM 270 in accordance with the target path to be followed can be associated with acceleration profiles and curvature profiles which describe a desired vehicle velocity and turning for a given manoeuvre. The TSM continuously requests the desired acceleration profiles and curvature profiles from the VMM function 250 which performs force allocation, normally involving steering, to meet the requests from the TSM function 270.

Both the MSD control unit 240, the VMM function 250, and the TSM function 270 may have access to sensor data from various on-board vehicle sensors 260, upon which vehicle control may be based. These sensors may comprise, e.g., global positioning system (GPS) receivers, vision-based sensors, wheel speed sensors, radar sensors and/or lidar sensors. The sensors are, among other things, configured to determine a vehicle location in relation to a reference path.

Figure 3:
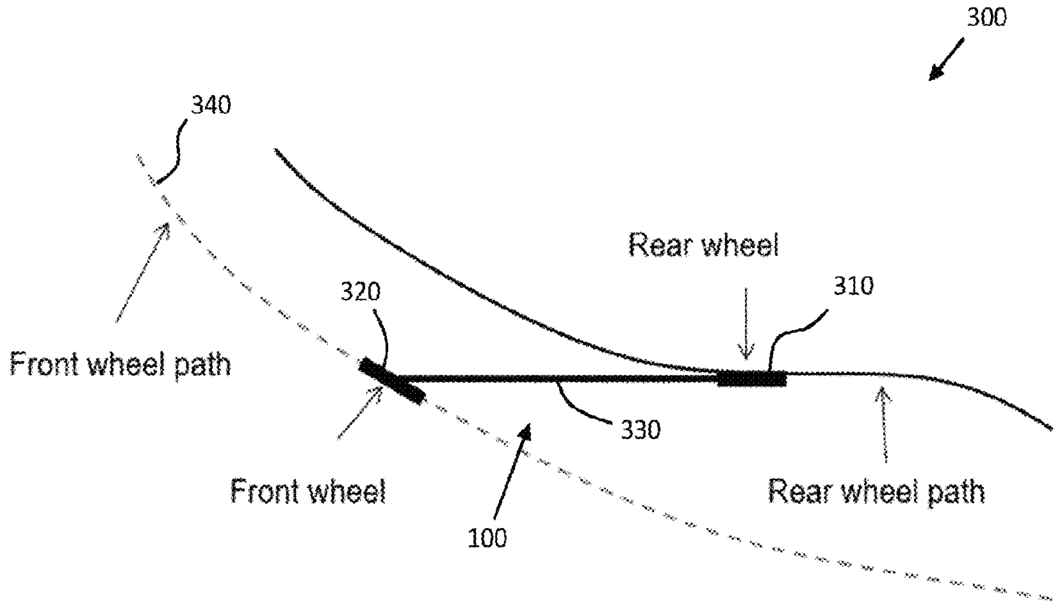
FIG. 3 schematically illustrates a front wheel following a front wheel target path.

FIG. 3 illustrates path following by an example vehicle 100, here modelled using a bicycle model, although other vehicle models may of course also be used. The bicycle model comprises a rear wheel 310 rigidly connected 330 to a front wheel 320. A target front wheel path 340 has been defined, and the front wheel steering is controlled such that the front wheel 320 follows the front wheel path 340 as closely as possible.

Figure 4:
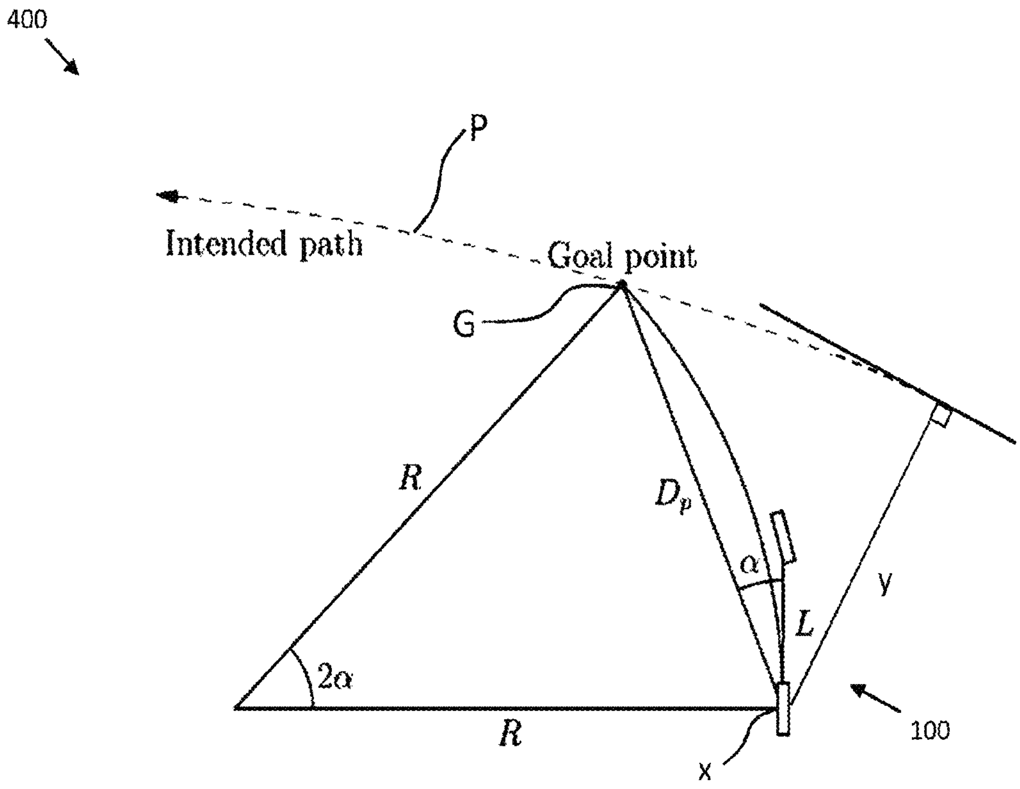
FIG. 4 illustrates path following by a pure pursuit-based method.

There are several different known path following algorithms which can be used at the TSM function 270 to control the steering of the front wheel 320 to follow the target front wheel path 340. For instance, FIG. 4 shows an example 400 of how a pure pursuit algorithm may control a vehicle to follow an intended path or reference path P, here using the rear wheel as reference. Pure pursuit is a well-known path following algorithm which can be implemented with relatively low complexity, it is described, e.g., in "Implementation of the pure pursuit path tracking algorithm", by R. C. Coulter, Carnegie-Mellon University, Pittsburgh PA Robotics INST, 1992. The vehicle 100 in the example 400 is located at a vehicle location x, at a lateral deviation y from the reference path P. In the example 400 the vehicle has a wheel-base length L. The general idea behind the pure pursuit approach is to calculate the curvature that will take the vehicle from its current position x to a goal point G on the reference path P. The goal point is determined by defining a circle having radius R, such that the circle passes through both the goal point and the current vehicle position x. The vehicle is then controlled by a steering angle $\alpha$ determined in relation to this circle as shown in FIG. 4. The goal point is selected such that the distance from the vehicle location x to the goal point always equals a preview distance Dp.

Vector field guidance is another path following algorithm which instead bases the vehicle control on a vector field, which vector field is also determined based on a preview distance or look-a-head parameter. Vector field guidance methods were, e.g., discussed by Gordon, Best and Dixon in "An Automated Driver Based on Convergent Vector Fields", Proc. Inst. Mech. Eng. Part D, vol. 216, pp 329-347, 2002.

The techniques disclosed herein are applicable to a wide variety of path following algorithms, as will be understood from the more detailed description of the techniques given below.

As mentioned in the background section above, it is sometimes challenging to reverse a heavy-duty vehicle using the rear wheels as reference, since this may result in large magnitude movement at the front end of the vehicle 100. Thus, complex dedicated algorithms are often implemented which are used specifically during reversal.

Figure 5:
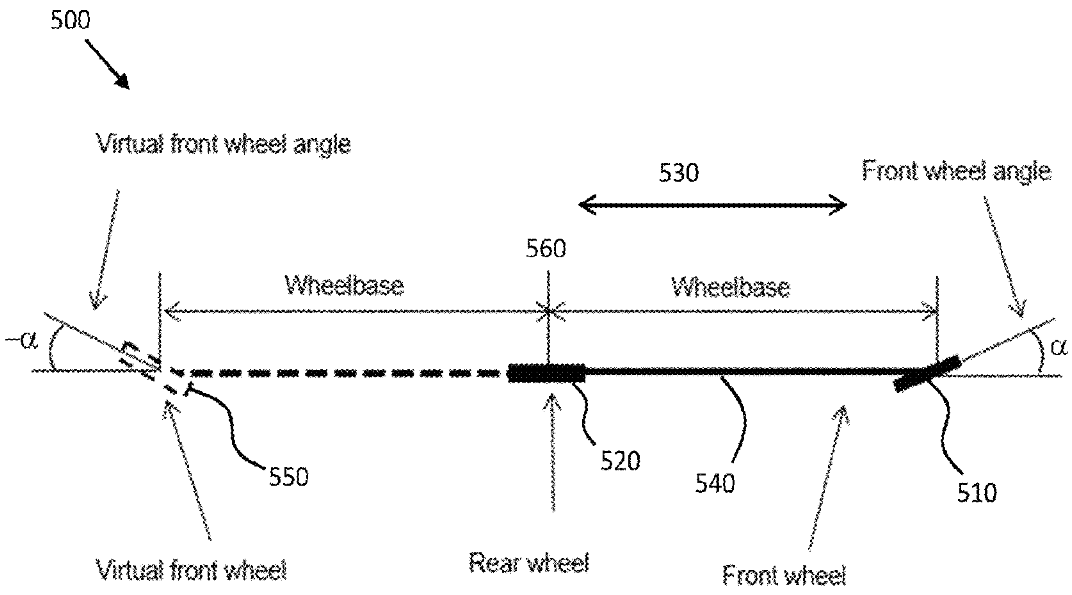
FIG. 5 illustrates the concept of a virtual front wheel geometry of a vehicle.

A purpose of the present disclosure is to enable re-use of the algorithms for forward direction driving also for reversal maneuvers. This can be achieved using a concept referred to herein as a virtual front wheel vehicle geometry. FIG. 5 illustrates an example of such a virtual front wheel geometry 500. In a virtual front wheel geometry, the vehicle model used for controlling the vehicle during the reversal maneuver is mirrored about a rear wheel location 560 on the vehicle 100. This essentially means that the front wheel 510, i.e., the model of the front wheels of the vehicle, is "folded" about the rear wheel location along a longitudinal extension direction 530 of a wheelbase 540 of the vehicle 100, as illustrated in FIG. 5. This way a virtual front wheel 550 can be defined which corresponds to the steered front wheel 510. To determine the location of the virtual front wheel 550 in relation to the rear and front wheels of the vehicle 100, it is sufficient that a reference position of the vehicle is known, and a vehicle orientation, such as an angle of the wheelbase 540 relative to some reference direction. The reference direction may be, e.g., geographic north or a tangent to the desired target path.

A steered angle of the front wheel 510 has a corresponding steered angle at the virtual front wheel 550. Thus, to generate a virtual front wheel angle at the virtual front wheel 550, the steered front wheel is steered by the same angle but in the opposite direction, as illustrated in FIG. 5. It is appreciated that steering can also be achieved using torque actuators of the vehicle 100, i.e., propulsion of braking actuators applied at different sides of the vehicle. Such MSD steering can be related to an equivalent front wheel angle, which then translates into an equivalent virtual front wheel angle.

Similar virtual front wheel geometries can be created using other types of vehicle models, such as a two-track model, which is a planar rigid model that approximates the vehicle as a rigid body with four wheels.

Figure 6:
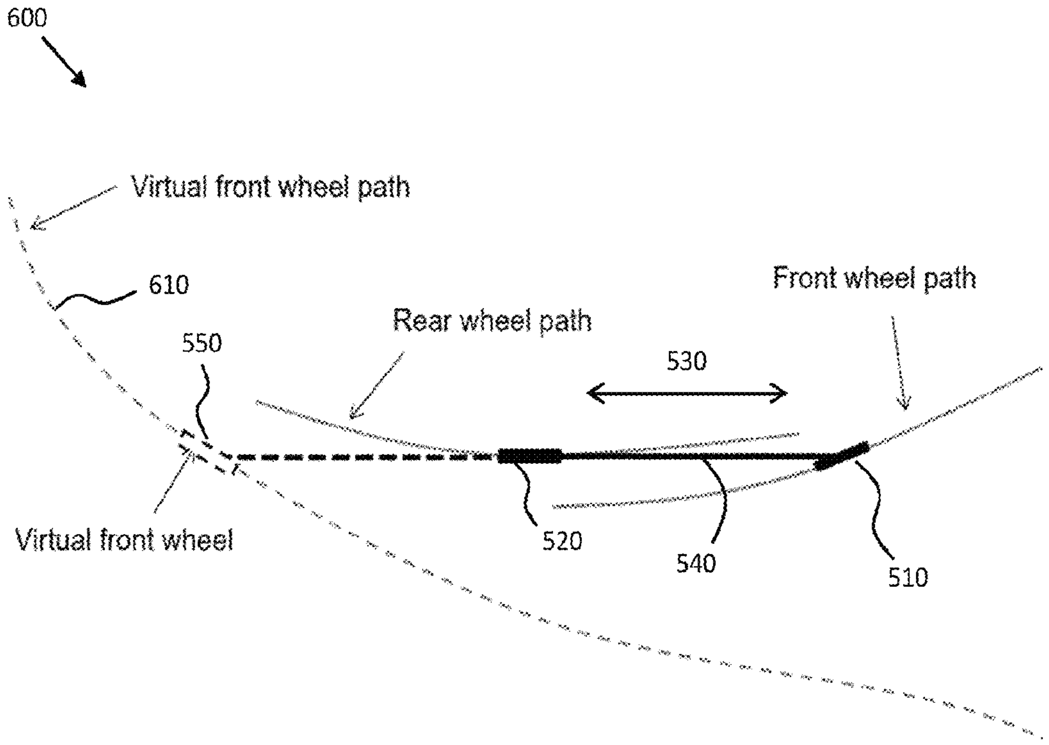
FIG. 6 illustrates a virtual front wheel following a virtual front wheel target path.

FIG. 6 shows an example 600 of how the virtual front wheel geometry can be used for path following during a reversal maneuver. In FIG. 6, a virtual front wheel path 610 has been defined. This virtual front wheel path can be defined given information about a target pose path indicative of a path to be followed by the vehicle and an orientation to be adhered to by the vehicle during the reversal maneuver, i.e., a sequence of locations and an orientation of the vehicle for each location. For each target location in the sequence of locations, a vehicle having the respective orientation can be mirrored as discussed above in connection to FIG. 5. This mirroring gives the position of the virtual front wheel in the virtual front wheel geometry. By storing the locations of the thus obtained virtual front wheel, the virtual front wheel path can be obtained.

The virtual front wheel 550 is then controlled such that it follows the virtual front wheel path as closely as possible, whereby the rear wheel will follow nicely "behind" the virtual front wheel, even though the rear wheel is actually the leading part of the true vehicle 100 during the maneuver. The virtual front wheel angles required in order for the virtual front wheel to follow the virtual front wheel path can be directly translated into actuator commands for the steered front wheel 510, or for other actuators, e.g., in case steering by braking is desired. This means that the vehicle is essentially controlled just like it is during a forward motion path following maneuver. The rear wheel 520 will follow the virtual front wheel just as during a forward driving path following maneuver. Thus, a forward direction path following algorithm can be re-used also for reversal maneuvers, which is an advantage.

Figure 7:
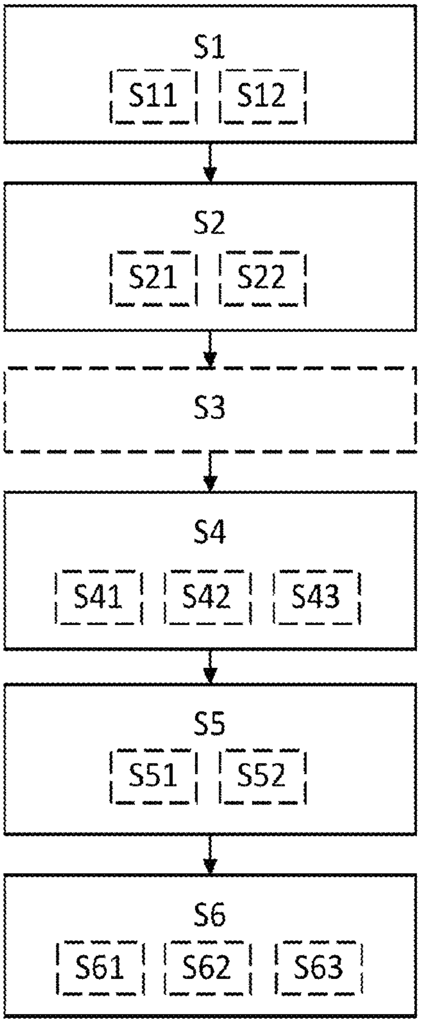
FIG. 7 is a flow chart illustrating methods.

FIG. 7 is a flow chart illustrating a computer implemented method for controlling a non-articulated heavy-duty vehicle 100 during a reversal maneuver. The method comprises obtaining S1 a pose path indicative of a path to be followed by the vehicle 100 and an orientation to be adhered to by the vehicle 100 during the reversal maneuver. A pose path is a data set which describes the vehicle path to be followed. This can be achieved, e.g., by a sequence of reference positions S11 in combination with an orientation of the vehicle 100 at each reference position along the path, where the vehicle orientations can be defined, e.g., by associating a wheelbase angle S12 relative to a global reference direction to each location along the path or an angle of the wheelbase relative to a tangent of the target path. It is important that the vehicle orientations along the target path are known and not just the reference positions, in order to be able to perform the mirroring operation that determines the virtual front wheel position of the vehicle along the target path to be followed. In other words, the pose path not only indicates the desired track of a reference point on the vehicle, but also how the vehicle body should be oriented along the path, i.e., how the wheelbase should be angled relative to the track, or to some other reference direction. This type of pose path can be determined by recording reference positions and corresponding vehicle orientations along a desired track to be followed during the reversal maneuver, or by computer simulation involving a vehicle model and a target path to be adhered to by a rear wheel on the vehicle.

The method illustrated in FIG. 7 also comprises determining S2 a virtual front wheel geometry 500 of the vehicle 100 as discussed above, i.e., by mirroring a steered front wheel 510 of the vehicle about a non-steered rear wheel 520 location on the vehicle 100, along a longitudinal extension direction 530 of a wheelbase 540 of the vehicle 100, where the mirrored steered front wheel 510 corresponds to a virtual front wheel 550 in the virtual front wheel geometry 500.

By establishing S4 a control relationship between the virtual front wheel 550 and the steered front wheel 510, such that a steered angle at the virtual front wheel 550 corresponds to an equivalent steered angle at the steered front wheel 510, a means for controlling the virtual front wheel of the virtual front wheel geometry is obtained.

Now, given the virtual front wheel geometry 500 of the vehicle 100 and the pose path, it becomes possible to determine S5 a virtual front wheel target path 610, and also to control S6 the heavy-duty vehicle 100 during the reversal maneuver by controlling the virtual front wheel 550 to follow the virtual front wheel target path 610. This way a standard forward driving path following algorithm can be re-used also for reversal maneuvers. In fact, the forward driving path following algorithm does not need to be aware of if the vehicle is reversing or driving in forward direction, since the input data to the path following algorithm (implemented e.g. in the TSM function 270) will be of the same type, i.e., a forward direction path is replaced by the virtual front wheel path and the steering commands at the virtual front wheel will be translated into equivalent front wheel angles by a change in sign of the steered angle.

Some vehicle types have more than one rear wheel axle. In this case the rear wheel location of the virtual front wheel geometry of the vehicle 100 can be defined S22 using a lumped axle non-steered rear wheel in a bicycle model of the vehicle 100.

The control relationship S41 between the virtual front wheel 550 and the steered front wheel 510 is normally a mirrored steering angle relationship as discussed above, i.e., a steered angle $\alpha$ at the virtual front wheel has a direct correspondence with a steered angle at the front wheel of opposite sign. In other words, the control relationship S42 between the virtual front wheel 550 and the steered front wheel 510 can be determined by a change of sign in steered angle. However, the control relationship S43 between the virtual front wheel 550 and the steered front wheel 510 can also be determined by a coordination of a plurality of MSDs of the vehicle 100.

Figure 8:
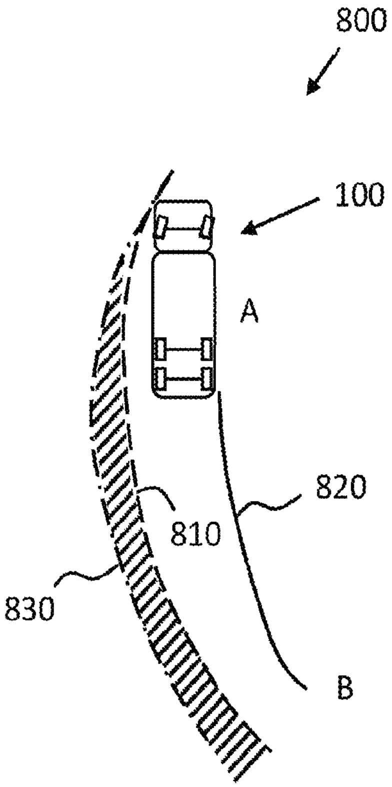
FIG. 8 schematically illustrates a swept area during a reversal maneuver.

The herein discussed methods can also be used for validating S3 the pose path based on the determined virtual front wheel geometry 500 of the vehicle 100 and triggering an event in case the validation fails. The method may, for instance, comprise predicting S31 a swept area of the vehicle during the maneuver and comparing the swept area to an allowable driving area associated with the reversal maneuver, and also predict S32 a maximum steering angle of the vehicle during the maneuver and comparing the maximum steering angle to an allowable range of steering angles associated with the vehicle 100. FIG. 8 illustrates a predicted swept area during an example reversal maneuver 800. The vehicle 100 is to be reversed from location A to location B, and the drivable area is limited by the dashed line 810 on one side and the solid line 820 on the other side. To predict the swept area during reversal, a virtual front wheel geometry can be defined, and the motion of the vehicle 100 can be simulated as is completes the reversal maneuver, using the virtual front wheel geometry, in the same way as predictions of swept area is determined when driving in the forward direction. In case the simulated swept area (illustrated by the dash-dotted line 830 and the solid line 820) exceeds the allowable area, then an event such as a warning signal or the like can be triggered. Generally, since a standard forward driving path following algorithm is used also for reversal, any associated functions for forward driving path following can also be re-used, such as validation functions that determine if a given forward driving path is feasible to follow or not, if a given path can be followed in a safe manner, and also algorithms for determining a suitable acceleration profile and speed along the target path.

Figure 9:
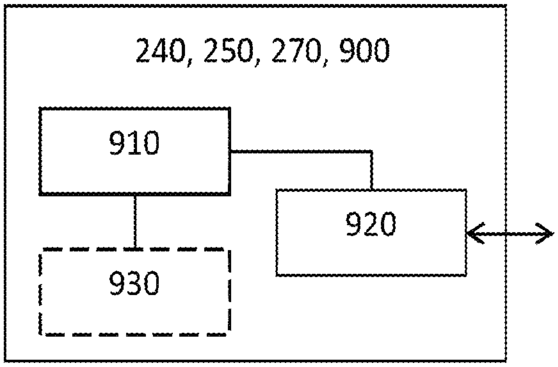
FIG. 9 schematically illustrates a control unit.

FIG. 9 schematically illustrates, in terms of a number of functional units, the components of a control unit 240, 250, 270, 900 according to embodiments of the discussions herein. This control unit may be comprised in the vehicle 100, e.g., in the form of a VMM or TSM unit. Processing circuitry 910 is provided using any combination of one or more of a suitable central processing unit CPU, multiprocessor, microcontroller, digital signal processor DSP, etc., capable of executing software instructions stored in a computer program product, e.g., in the form of a storage medium 930. The processing circuitry 910 may further be provided as at least one application specific integrated circuit ASIC, or field programmable gate array FPGA.

Particularly, the processing circuitry 910 is configured to cause the control unit 900 to perform a set of operations, or steps, such as the methods discussed in connection to FIG. 8 and elsewhere herein.

For example, the storage medium 930 may store the set of operations, and the processing circuitry 910 may be configured to retrieve the set of operations from the storage medium 930 to cause the control unit 900 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The control unit 900 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the control unit 240, 250, 270, 900, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Thus, FIG. 8 is a schematic illustration of a control unit 240, 250, 270, 900 for controlling a heavy-duty vehicle 100 during a reversal maneuver, the control unit comprising processing circuitry 910 configured to obtain a pose path indicative of a path to be followed by the vehicle 100 and an orientation to be adhered to by the vehicle 100 during the reversal maneuver, determine a virtual front wheel geometry 500 of the vehicle 100 by mirroring a steered front wheel 510 of the vehicle about a non-steered rear wheel 520 location on the vehicle 100, along a longitudinal extension direction 530 of a wheelbase 540 of the vehicle 100, where the mirrored steered front wheel 510 corresponds to a virtual front wheel 550 in the virtual front wheel geometry 500, establish a control relationship between the virtual front wheel 550 and the steered front wheel 510, such that a steered angle at the virtual front wheel 550 corresponds to an equivalent steered angle at the steered front wheel 510, determine a virtual front wheel target path 610 based on the virtual front wheel geometry 500 of the vehicle 100 and on the pose path and control the heavy-duty vehicle 100 during the reversal maneuver by controlling the virtual front wheel 550 to follow the virtual front wheel target path 610.

According to some aspects, the processing circuitry is also arranged to validate the pose path based on the determined virtual front wheel geometry 500 of the vehicle 100 and trigger an event in case the validation fails.

Figure 10:
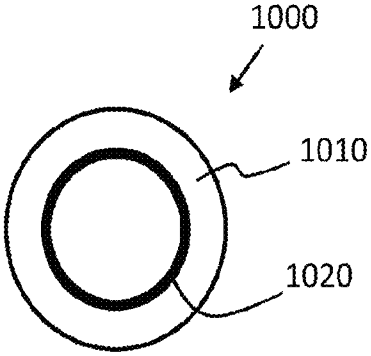
FIG. 10 shows an example computer program product.

FIG. 10 illustrates a computer readable medium 1010 carrying a computer program comprising program code means 1020 for performing the methods illustrated in FIG. 8, when said program product is run on a computer. The computer readable medium and the code means may together form a computer program product 1000.

The invention claimed is:

1. A computer implemented method for controlling a non-articulated heavy-duty vehicle during a reversal maneuver, the method comprising obtaining a pose path indicative of a path to be followed by the vehicle and an orientation to be adhered to by the vehicle during the reversal maneuver, determining a virtual front wheel geometry of the vehicle by mirroring a steered front wheel of the vehicle about a non-steered rear wheel location on the vehicle, along a longitudinal extension direction of a wheelbase of the vehicle, where the mirrored steered front wheel corresponds to a virtual front wheel in the virtual front wheel geometry, establishing a control relationship between the virtual front wheel and the steered front wheel, such that a steered angle at the virtual front wheel corresponds to an equivalent steered angle at the steered front wheel, determining a virtual front wheel target path based on the virtual front wheel geometry of the vehicle and on the pose path, and controlling the heavy-duty vehicle during the reversal maneuver by controlling the virtual front wheel to follow the virtual front wheel target path.

2. The method according to claim 1, where the pose path comprises a sequence of reference positions and corresponding orientations of the vehicle.

3. The method according to claim 1, where a vehicle orientation is defined by a wheelbase angle relative to a global reference direction.

4. The method according to claim 1, where the steered front wheel of the virtual front wheel geometry of the vehicle is a steered front wheel in a bicycle model of the vehicle.

5. The method according to claim 1, where the rear wheel of the virtual front wheel geometry of the vehicle is a lumped axle non-steered rear wheel in a bicycle model of the vehicle.

6. The method according to claim 1, where the control relationship between the virtual front wheel and the steered front wheel is a mirrored steering angle relationship.

7. The method according to claim 1, where the control relationship between the virtual front wheel and the steered front wheel is determined by a change of sign in steered angle.

8. The method according to claim 1, where the control relationship between the virtual front wheel and the steered front wheel is determined by a coordination of a plurality of motion support devices, MSD, of the vehicle.

9. The method according to claim 1, comprising validating the pose path based on the determined virtual front wheel geometry of the vehicle, and triggering an event in case the validation fails.

10. The method according to claim 9, where the validating comprises predicting a swept area of the vehicle during the maneuver and comparing the swept area to an allowable driving area associated with the reversal maneuver.

11. The method according to claim 9, where the validating comprises predicting a maximum steering angle of the vehicle during the maneuver and comparing the maximum steering angle to an allowable range of steering angles associated with the vehicle.

12. The method according to claim 1, wherein controlling the heavy-duty vehicle comprises performing a driver assistance function, a semi-autonomous drive application, or an autonomous drive application.

13. A non-transitory computer readable medium carrying a computer program comprising program code for performing the steps of claim 1 when said program code is run on a computer or on processing circuitry of a control unit.

14. A control unit for controlling a heavy-duty vehicle during a reversal maneuver, the control unit comprising processing circuitry configured to obtain a pose path indicative of a path to be followed by the vehicle and an orientation to be adhered to by the vehicle during the reversal maneuver, determine a virtual front wheel geometry of the vehicle by mirroring a steered front wheel of the vehicle about a non-steered rear wheel location on the vehicle, along a longitudinal extension direction of a wheelbase of the vehicle, where the mirrored steered front wheel corresponds to a virtual front wheel in the virtual front wheel geometry, establish a control relationship between the virtual front wheel and the steered front wheel, such that a steered angle at the virtual front wheel corresponds to an equivalent steered angle at the steered front wheel, determine a virtual front wheel target path based on the virtual front wheel geometry of the vehicle and on the pose path, and control the heavy-duty vehicle during the reversal maneuver by controlling the virtual front wheel to follow the virtual front wheel target path.

15. The control unit according to claim 14, where the processing circuitry is also arranged to validate the pose path based on the determined virtual front wheel geometry of the vehicle and to trigger an event in case the validation fails.

16. A heavy-duty vehicle comprising a control unit according to claim 14.

* * * * *